United States Patent [19]
Schultze et al.

[11] 3,720,650
[45] Dec. 12, 1972

[54] PROCESS FOR PREPARING SINTERED POWDER OF POLYAMIDE 12

[75] Inventors: Hans Joachim Schultze, Chur, Grisons; Ruthild Henn, Domat-ems, Grisons, both of Switzerland

[73] Assignee: Inventa A.G. Fur Forschung und Patentverwertung, Zurich, Switzerland

[22] Filed: Feb. 8, 1971

[21] Appl. No.: 113,765

[52] U.S. Cl............................260/78 L, 260/33.6 R
[51] Int. Cl. ..............................C08g 20/42
[58] Field of Search..................260/78 L, 33.6 R

[56] References Cited

UNITED STATES PATENTS

| | | |
|---|---|---|
| 3,446,782 | 5/1969 | Okazaki et al. ...............260/78 L |
| 3,476,711 | 11/1969 | Muller et al....................260/78 L |
| 3,481,906 | 12/1969 | Maruyama et al. ............260/78 L |
| 3,484,415 | 12/1969 | Sahler............................260/78 L |
| 3,583,952 | 6/1971 | McGrath........................260/78 L |

*Primary Examiner*—William H. Short
*Assistant Examiner*—L. M. Phynes
*Attorney*—Cecily L. Frey

[57] ABSTRACT

In a process for preparing polyamide 12 (polydodecanoic acid amide) as sintered powder by dissolving the polyamide 12 in molten caprolactam, cooling the melt so obtained and treating it with a solvent for caprolactam, the improvement, which consists in carrying out the solvent treatment with benzene or toluene at elevated temperature.

7 Claims, No Drawings

PROCESS FOR PREPARING SINTERED POWDER OF POLYAMIDE 12

The present invention relates to a process for preparing sintered powder of polyamide 12 by extracting a mass of polyamide/12/caprolactam with benzene or toluene at elevated temperature; that is to say, polyamide 12 is being dissolved in molten caprolactam, the melt is allowed to cool, and is thereafter extracted by benzene or toluene.

The conventional manner for preparing sintered powder of polyamide 12 consists in dissolving the polyamide in the form of chips in a suitable solvent at elevated temperature. Upon cooling, a powder separates having more or less fine grain size. Among other solvents, caprolactam may be used in form of a melt or as aqueous solution. Since the solvent power of diluted aqueous lactam solutions for polyamide 12 is low even at temperatures above 150°C, caprolactam concentrations of 60-95 percent are preferably used (U.S. Pat. No. 3,446,782).

The processing of the solidified or almost solidified caprolactam melt or of the concentrated caprolactam solution in water containing polyamide 12 in a finely distributed state is usually effected by adding water to the products. The amount of water should be so measured as to yield a suspension of the polyamide powder in the aqueous caprolactam solution which will have good flow and filtering properties. Experience has shown that in a caprolactam solution containing 10-30 percent by weight of polyamide 12, calculated on caprolactam, the lactam content of the aqueous caprolactam/polyamide solution must not exceed 30 percent by weight. When higher polyamide concentrations or lower quantities of water are present, a mash or pulp is obtained, which can only be filtered with difficulty, if at all. As a result, caprolactam is obtained in aqueous solutions of very low concentrations, when the very diluted caprolactam washing waters obtained by rinsing the filtered polyamide powder, are likewise added. Since, however, the use of caprolactam as solvent for polyamide 12 is only economical if the caprolactam can be reused continually, it will become necessary to re-concentrate the diluted aqueous solutions, for instance, by distillation and sometimes by a further distillation of the caprolactam. However, due to the high heat of evaporation of water, the removal of the same by repeated distillations incurs considerable expenses.

It is the object of the present invention to overcome the drawbacks of the known methods of preparing polyamide 12 in the form of sintered powder and to provide a process which is simple and economical. Other objects and advantages of the present invention will become apparent from the following detailed description.

It has been found that the objects of the invention may be achieved by using as solvent, instead of water, benzene or toluene in the work-up of caprolactam/polyamide 12 melt. This can be done without causing a disadvantageous change of the quality of the polylaurinlactam powder as compared to the polyamide powder obtained with the use of water. This fact is surprising because benzene and toluene are excellent solvents for the additives normally contained in the polyamide, such as lubricants and flowing adjuvants as well as optical and thermal stabilizers. Contrary to expectations, the above agents are not extracted from the polyamide powder under the conditions applied, and that in spite of the fact that the polyamide has an extraordinary large surface due to the small grain size of the individual particles.

The important advantage of benzene or toluene used as solvents for caprolactam instead of water is due to the fact that both substances have a much lower heat of evaporation so that the processing of the same amounts by distillation is by far less expensive. This can be seen by the comparison of the values of heat of evaporation of water, benzene and toluene, in the table below.

| Solvent | Heat of Evaporation | Boiling Point |
| --- | --- | --- |
| Water | 539.6 | 100°C |
| Benzene | 94.3 | 80.2 |
| Toluene | 84.1 | 110.7 |

If the energy needed for the distillation of equal amounts of solvents is set at 100 percent for water, there is a saving of 82.5 percent of the energy spent when benzene is used, and 84.4 percent with the use of toluene.

In carrying out the process of the invention, 10-40 parts by weight, preferably 20-30 parts by weight, of polyamide 12 are dissolved in 60-90 parts by weight, preferably 70-80 parts by weight, of caprolactam at temperatures between 150° and 200°C; the melt containing polyamide 12/caprolactam is solidified by cooling. In a modified manner of carrying out the operation, the polyamide and the caprolactam can be heated up together. In any case, the melt is allowed to cool down thereafter. In the case of further work-up with benzene the melt is brought down to a temperature of 70°-80C, in the case of toluene, to 70°-90°C. At the indicated temperature, the mass is stirred in the solvent, until the caprolactam has become completely dissolved and a homogeneous polyamide suspension has formed. The polyamide powder is separated from the concentrated caprolactam/benzene or caprolactam/toluene solution solution by filtering or centrifuging and is then rinsed with such a quantity of benzene or toluene, respectively, that finally the ratio caprolactam (parts by weight) : benzene or toluene (parts by volume) will be 1:2.5-1:4, or preferably 1:3-1:4. The resulting polyamide powder is completely free of caprolactam.

That means that for the work-up of one part by weight of the caprolactam/polyamide melt of the above specified preferred composition, about 3 parts by volume of benzene or toluene are needed. If the same amount of the caprolactam/polyamide melt were treated with water, 5 volume parts would be required, because water is firmly attached by absorption to the polyamide particles. With the non-polar solvents benzene and toluene, this is not the case; therefore it is possible to obtain the polyamide 12-suspension with desired flow and filtering characteristics with the use of considerable less benzene or toluene. It is another advantage when using benzene or toluene that the time-consuming drying process necessary with water, is simplified with the use of benzene or toluene since in that case the absorptive attachment of the solvent to the polyamide particles is absent.

The concentrated caprolactam solution in benzene or toluene obtained in the removal of the polyamide, may be separated, e.g., by distillation, into pure solvent and caprolactam. The rinsing solutions containing only small amounts of caprolactam are used in the next operation for treating the polyamide-caprolactam melt, the last of the rinsing solutions, which only contain traces of caprolactam, are used for washing the polyamide powder resulting from that melt. The utilization of benzene and toluene in the process of the invention is therefore extremely economical. The energy expenses for the work-up of the solvents are reduced to a minimum.

The polyamide 12 powder may be used, after drying, as sinter powder for the electrostatic coating of metallic articles. Of the particles obtained, at least 98 percent have a grain size below $50\mu$.

In the following, the invention will be more fully explained by a number of examples, but it should be understood that these are given by way of illustration only, and not of limitation, and that many modifications of the details may take place without departing from the spirit of the invention.

EXAMPLE 1

500 g of a solidified melt obtained by dissolving 100 g polyamide 12 in 400 g caprolactam at 180°C within an hour and subsequent cooling to about 60°C, are stirred during 2 hours with 500 ml toluene at 80°C. A homogeneous suspension of polyamide is thereby obtained which can be freed substantially from the toluene solution by filtering with suction. The polyamide 12 powder is again suspended in 500 ml toluene at 80°C by stirring for one hour, filtered with suction once more, washed with another 500 ml toluene at 80°C, with the temperature taken above the filter, and subsequently dried. Obtained are 97-98 g polyamide 12 as a very fine sintered powder. When electrostatically coated on a metal surface and melted thereon, there is no difference between the characteristics of the powder as to flow, surface quality, and color stability when compared with polyamide 12 sinter powder obtained by the use of water.

EXAMPLE 2

150 g polyamide 12 are dissolved in 350 g caprolactam during 1½ hours at 190°C. The melt obtained is allowed to cool and then stirred with 500 ml benzene at 80°C for 1½ hours. The polyamide suspension is freed substantially of the benzene solution by centrifuging. By suspending the polyamide 12 powder once more in 400 ml benzene at 80°C while stirring for one hour, centrifuging, rinsing again with another 400 ml benzene at 80°C and subsequent drying, 146.5 g polyamide 12 were obtained as sintered powder. The caprolactam solution in benzene, about 41 percent strong, obtained by the first treatment of the melt in benzene, is separated by simple distillation into benzene and caprolactam. The recovered benzene may be used again for extraction. The remaining caprolactam is also returned to the melting process. The first rinsing solution of benzene is used in a new cycle for dissolving the caprolactam, the second rinsing solution in this new cycle is used for first washing the polyamide powder. The same result is obtained by carrying out the treatment with benzene at 70°C.

EXAMPLE 3

100 g polyamide 12 are dissolved in 400 g caprolactam at 150°C, and further treatment is carried out as described in example 1; the temperature of treatment with toluene is 70°C for one batch, 90°C for another batch, the total amount of toluene being 1,400 ml. In both cases, the results obtained are the same as in example 1.

It will be obvious to the expert that changes in the details will not interfere with the spirit of the invention as set forth in the appended claims.

What we claim is:

1. In a process for preparing polydodecanoic acid amide as sintered powder by dissolving polyamide 12 in molten caprolactam, cooling the melt so obtained, and removing the caprolactam by means of a solvent, the improvement which consists in treating the melt by extracting the caprolactam with a solvent selected from the group of hydrocarbons consisting of benzene and toluene at temperatures between 70° and 90°C.

2. The process according to claim 1, wherein 10-40 percent by weight of polydodecanoic acid amide are dissolved in 60-90 percent by weight of caprolactam at 150°-200°C, the weight being calculated on the resulting melt.

3. The process according to claim 2, wherein 20-30 percent by weight of polydodecanoic acid amide are dissolved in 70-80 percent by weight of caprolactam.

4. The process according to claim 1, wherein the solvent is benzene and the temperature of the solvent is from 70° to 80°C.

5. The process according to claim 1, wherein the solvent is toluene and the temperature of the solvent is from 70° to 90°C.

6. The process according to claim 1, in which the polydodecanoic acid amide obtained by solvent treatment undergoes a washing operation, whereby the amount of solvent used for extracting and washing operations is such that as a whole the ratio of caprolactam in parts by weight : solvent in parts by volume is from 1:2.5-1:4.

7. The process according to claim 6, wherein the ratio of caprolactam in parts by weight : solvent in parts by volume is 1:3-1:4.

* * * * *